(12) United States Patent
Kao et al.

(10) Patent No.: US 7,376,444 B2
(45) Date of Patent: May 20, 2008

(54) METHOD AND APPARATUS FOR RADIO FREQUENCY IDENTIFICATION

(75) Inventors: Chia-Hung Kao, Taipei (TW); Chih-Wei Wu, Taipei (TW)

(73) Assignee: Jigatek Corporation, Taipei (TW)

( * ) Notice: Subject to any disclaimer, the term of this patent is extended or adjusted under 35 U.S.C. 154(b) by 111 days.

(21) Appl. No.: 10/787,310

(22) Filed: Feb. 27, 2004

(65) Prior Publication Data

US 2005/0192053 A1    Sep. 1, 2005

(51) Int. Cl.
*H04M 1/00* (2006.01)

(52) U.S. Cl. ............... 455/558; 455/575.7; 455/575.5; 455/575.1; 455/41.2

(58) Field of Classification Search ................ 455/558, 455/426.1, 575.7, 575.5, 575.1, 41.2
See application file for complete search history.

(56) References Cited

U.S. PATENT DOCUMENTS 6,719,206 B1 * 4/2004 Bashan et al. .............. 235/492

| | | | |
|---|---|---|---|
| 6,993,319 B2 * | 1/2006 | Himmel et al. | 455/456.6 |
| 2002/0098830 A1 * | 7/2002 | Lauper et al. | 455/411 |
| 2003/0017848 A1 * | 1/2003 | Engstrom et al. | 455/558 |
| 2003/0141989 A1 * | 7/2003 | Arisawa et al. | 340/870.01 |
| 2005/0104732 A1 * | 5/2005 | Furter et al. | 340/572.7 |
| 2005/0197169 A1 * | 9/2005 | Son | 455/558 |

FOREIGN PATENT DOCUMENTS

JP        2004348497 A   * 12/2004

* cited by examiner

Primary Examiner—Joseph Feild
Assistant Examiner—Randy Peaches
(74) Attorney, Agent, or Firm—Troxell Law Office, PLLC

(57) ABSTRACT

The present invention is a method and apparatus for radio frequency identification, comprising a supporter and a data card which can be connected with the supporter, wherein a user can easily carry and use an RFID data card, and, when co-operated with a supporter, the RFID data card can have wider application.

3 Claims, 7 Drawing Sheets

METHOD AND APPARATUS FOR RADIO FREQUENCY IDENTIFICATION

FIELD OF THE INVENTION

The present invention relates to an apparatus for radio frequency identification (RFID). More particularly, the present invention relates to one whose RFID data card can be easily carried and used, and co-operated with a supporter.

DESCRIPTION OF THE RELATED ART

As science and technology is advancing day by day, people are used to things like credit card, telephone card, ATM card, Key card, etc. in their daily life as digital identifications to get what they need. Yet most of the data cards today exchange data with the card readers by way of direct contact after plugging in. After a long term of using, the card will be damaged and the data in it will be wrongly recognized. Besides, the data card contacted directly has a specific direction and a specific contact point. If such a card is plugged in a wrong direction, the card reader will not be able to correctly recognize the data and might cause the damage of the data card as well as the card reader.

Therefore, some related company has developed an RFID (Radio Frequency Identification) system which is capable of exchanging data without contact to the reader. The RFID system conquers the defect of the direct-contacting system which delivers digital data by way of radio frequency signal and so data card can do data exchange without contact to the card reader. And, because such a way to deliver data through radio frequency signal demands no direction, the data card can be recognized by the card reader without taking it out, and the defect is conquered. Nevertheless, the data card itself is only a thin slice of card, so the user might not know where to place it and might look up everywhere but find nothing. Accordingly, conventional systems are not suitable for the users.

BRIEF SUMMARY OF THE INVENTION

Therefore, the main purpose of the present invention is to make the data card much easier to carry and utilize by the user. Further more; co-operated with the supporter, the data card can have broader application.

To achieve the above purpose, the present invention is a method and apparatus for radio frequency identification which comprises a supporter and a data card for storing data and being plugged into the supporter. And, an antenna which is to obtain induced voltage can be set on the supporter or the data card. By doing so, the user can easily carry and use the data card and, when co-operated with a supporter, the data card can have broader application.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
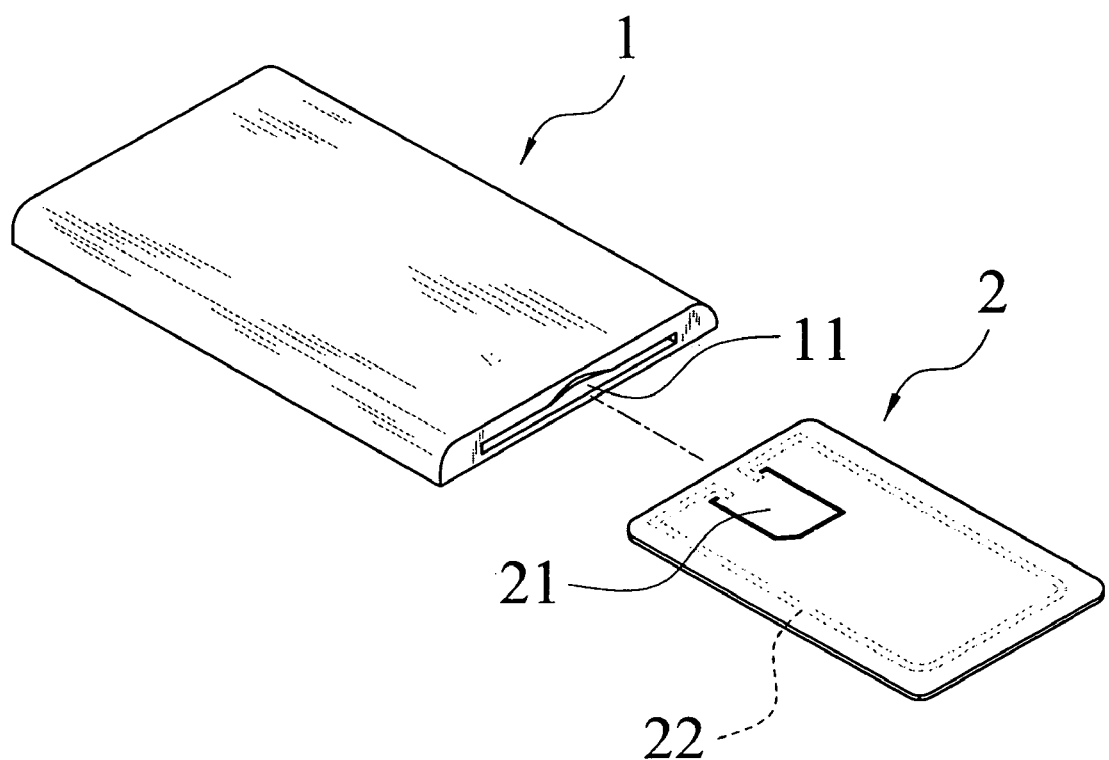
FIG. 1 is an exploded view of the structure of the first preferred embodiment according to the present invention.
Figure 2:
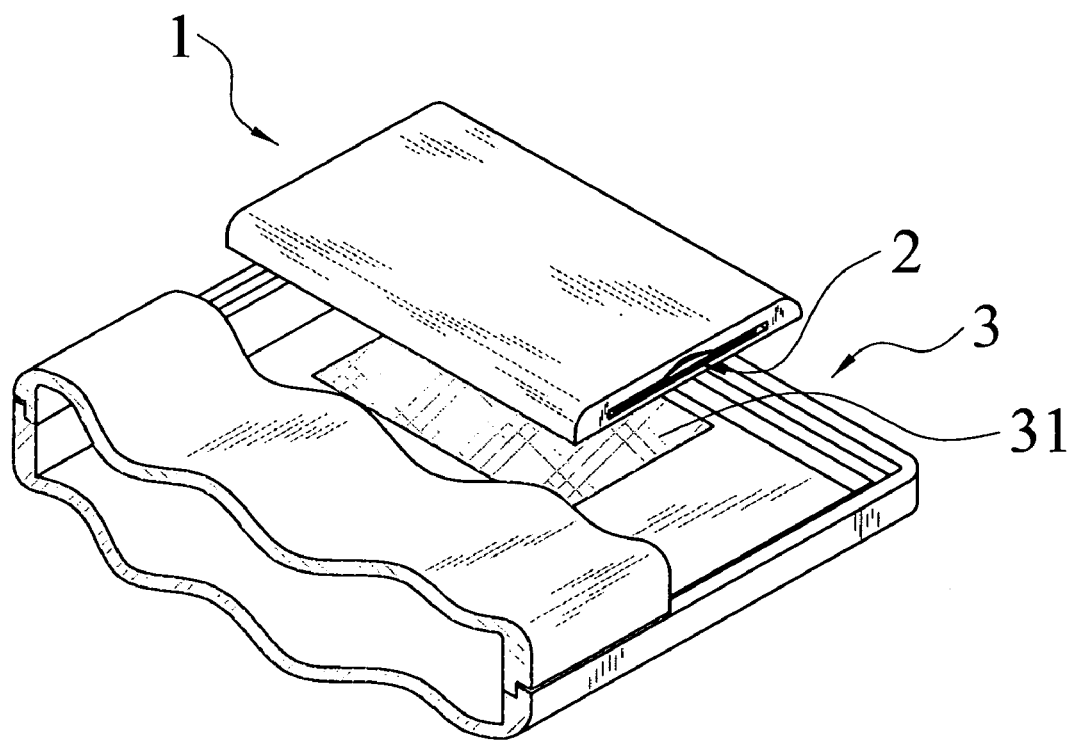
FIG. 2 is a perspective view showing status on use of the first preferred embodiment according to the present invention.

Please refer to FIG. 1 and FIG. 2, which are an exploded view of the structure and a perspective view showing status on use of the first preferred embodiment according to the present invention. As shown in the figures, present invention is a method and apparatus for radio frequency identification which comprises a supporter 1; and a data card 2 for easy carrying and using as well as further application when co-operated with the supporter. The supporter 1 comprises a slot 11 which can be an MP3, a mobile, a watch, or a belt which can be easily carried with. The data card 2 internally comprises a memory chip 21 to store data and can be plugged into the slot 11 of the supporter 1. The memory chip 21 comprises a plurality of component of diode and capacitor (not shown in the figures), and the memory chip 21 is connected to an antenna 22 which can be made of PCB or coiled enameled wire. The first preferred embodiment is so implemented.

According to the actual needs on assembling, the supporter 1 can be an MP3, a mobile, a watch, or a belt which can be easily carried with, and can provide a slot 11 for the data card 2 to plug in. When utilizing, the user only need to correspond the supporter 1 plugged with the data card 2 to the sensing area 31 of the reader to couple with each other to sense in a way of alternating magnetic field. And by coupling with each other in such a way, an induced voltage is obtained by the antenna 22 in the data card 2. Through the rectification and the wave filtering by the plurality of components of diode and capacitor, power is generated enough for the data card 2 to work. Further more, in order to transfer data to and from the reader 3, the data card 2 is supplied with steady alternating signal from the reader 3, and, at the same time, charges the battery by sensing the power of the reader 3. And it helps the memory chip 21 to exchange data by recognizing the data in the card 2.

Figure 3:
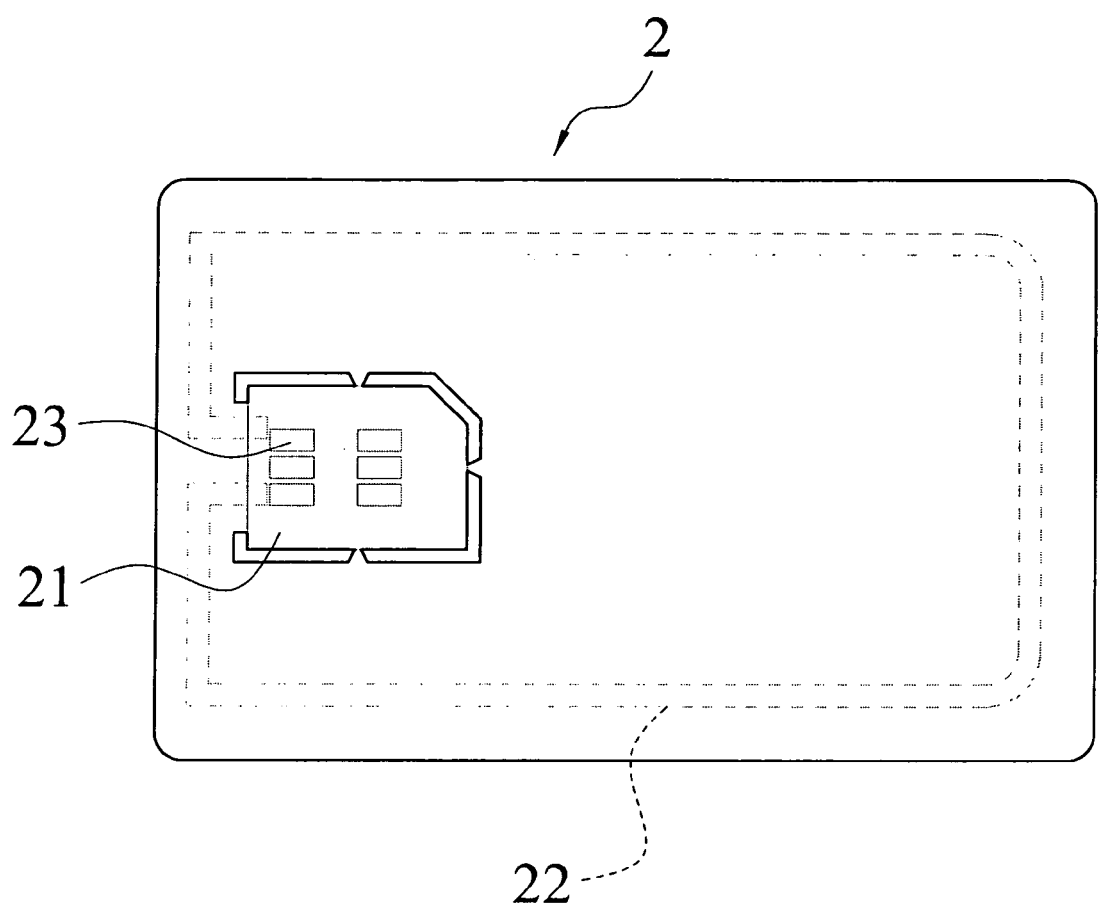
FIG. 3 is a perspective view of the data card of the first preferred embodiment according to the present invention.
Figure 4:
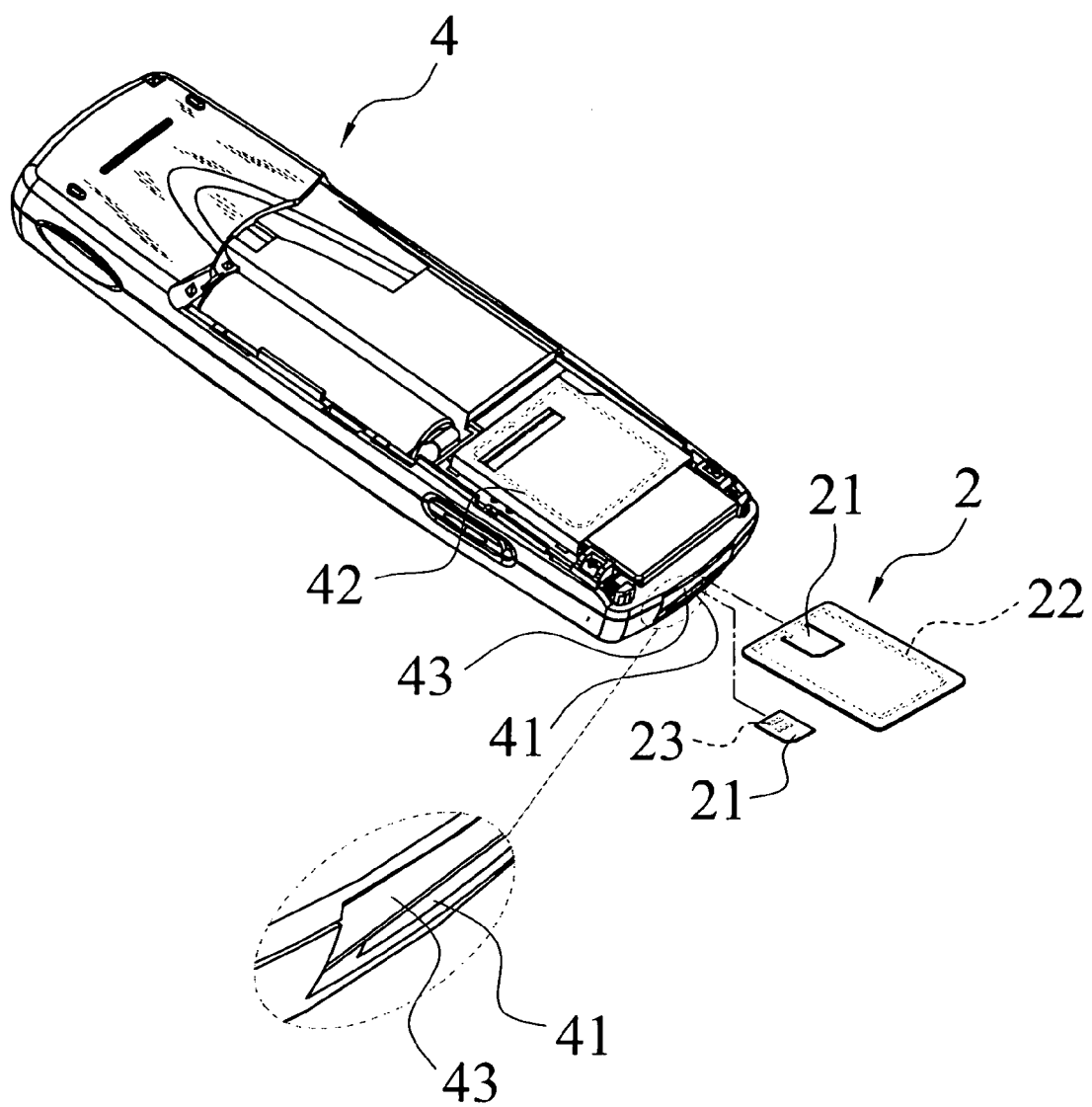
FIG. 4 is an exploded view of the structure of the second preferred embodiment according to the present invention.

Please refer to FIG. 3 till FIG. 4, which are a perspective view of the data card and an exploded view of the structure of the second preferred embodiment according to the present invention. As shown in the figures, the supporter 4 comprises a first slot 41 and internally connected with an antenna 42 which can be made of PCB or coiled enameled wire. The antenna 42 is beside the first slot 41 to be connected with a memory chip 21 plugged in. The supporter 4 can be an MP3, a mobile, a watch, or a belt which can be easily carried with.

The memory chip 21 is for storing data and comprises a plurality of component of diode and capacitor (not shown in the figures). And the memory chip 21 can be removed from the data card 2 and be plugged in the first slot 41 of the supporter 4, wherein the antenna 42 is electronically connected with the contact 23 on the surface of the memory chip 21. By doing so, the second preferred embodiment can be implemented according to the actual needs.

Furthermore, the present invention can further comprises a second slot 43, wherein the second slot 43 is for directly plugged with a data card 2 to implement the second preferred embodiment according to the actual needs. Therefore, the supporter 4 for the second preferred embodiment according to the present invention comprises at least one slot.

Figure 5:
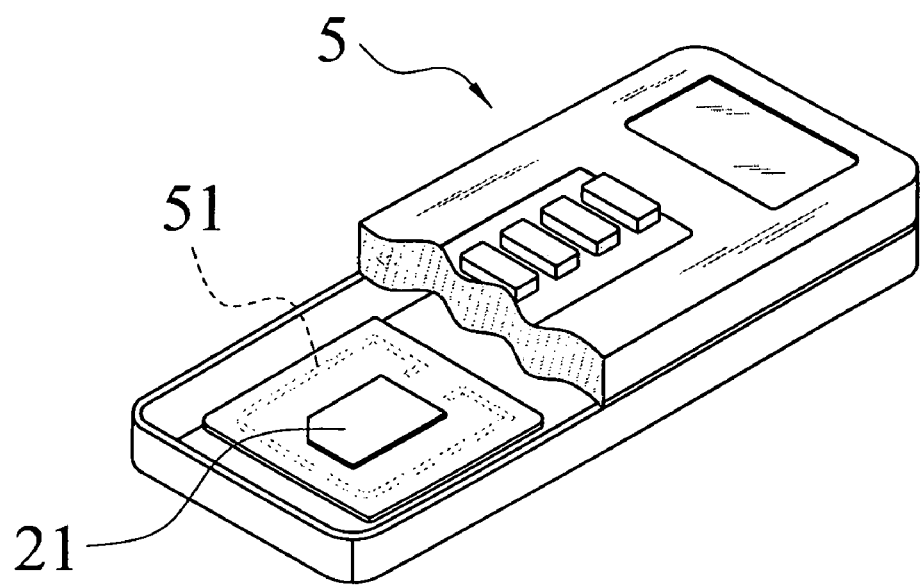
FIG. 5 is an exploded view of the structure of the third preferred embodiment according to the present invention.

Please refer to FIG. 5, which is an exploded view of the structure of the third preferred embodiment according to the present invention. As shown in the figure, the supporter internally comprises a memory chip 21 which comprises a plurality of components of diode and capacitor (not shown in the figures) for storing data, and an antenna 51 to obtain induced voltage. The antenna 51 can be made of PCB or coiled enameled wire, and the supporter 5 can be an MP3, a mobile, or a belt which can be easily carried with. By doing so, the third preferred embodiment can be implemented according to the actual needs.

Figure 6:
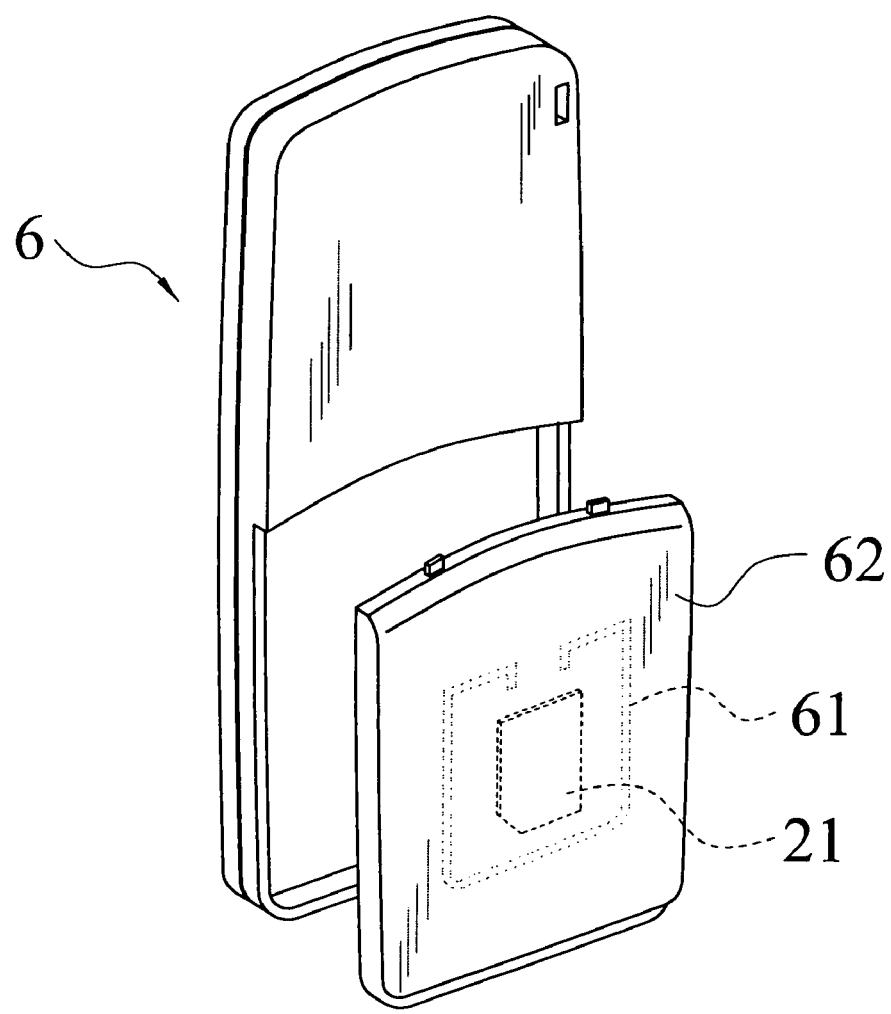
FIG. 6 is an exploded view of the structure of the fourth preferred embodiment according to the present invention.

Please refer to FIG. 6, which is an exploded view of the structure of the fourth preferred embodiment according to the present invention. As shown in the figure, a memory chip 62 and an antenna 61 are inside the shell of a supporter, and the antenna 61 can be changed according to different shapes of the supporter 6. The supporter 6 can be an MP3, a mobile, or a belt which can be easily carried with.

Figure 7:
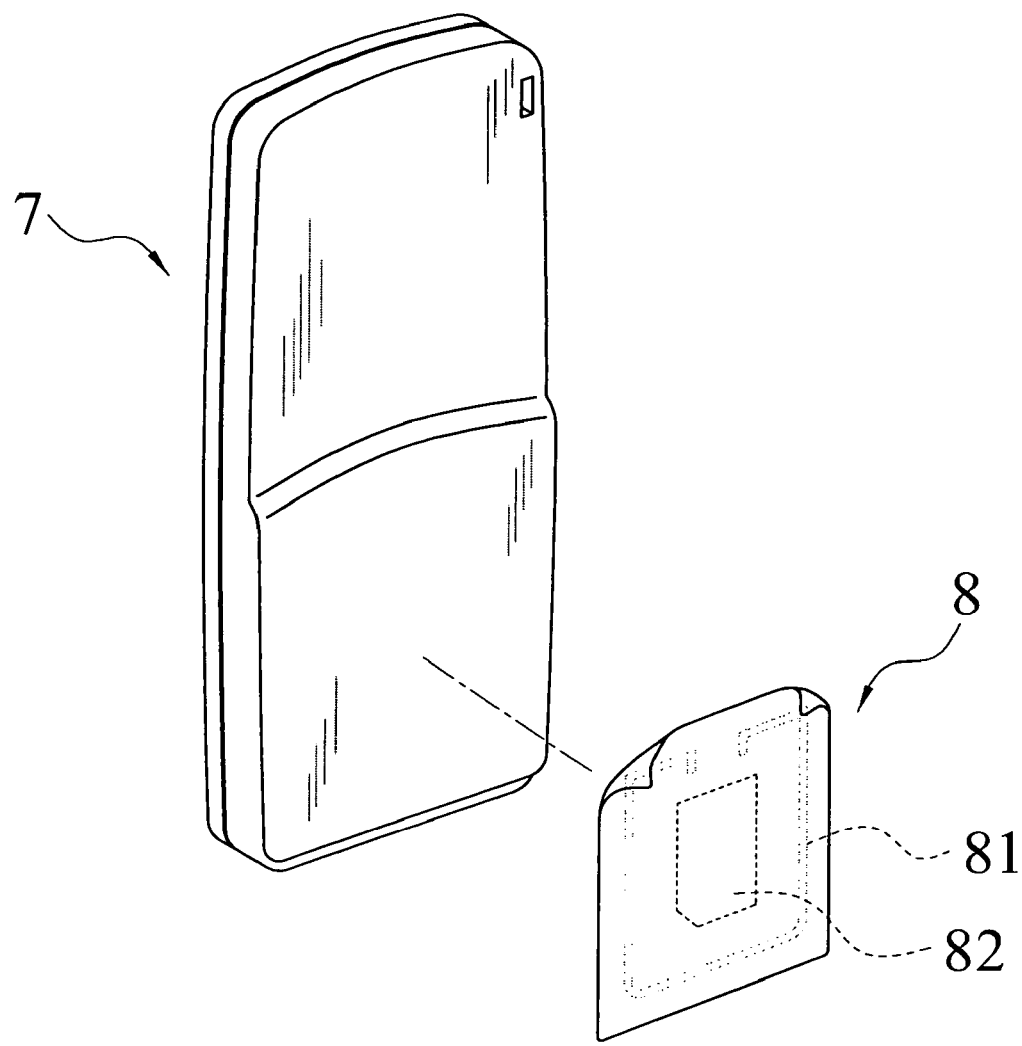
FIG. 7 is an exploded view of the structure of the fifth preferred embodiment according to the present invention.

Please refer to FIG. 7, which is an exploded view of the structure of the fifth preferred embodiment according to the present invention. As shown in the figures, a memory chip 81 and an antenna 81 are made into an adhering tag 8 adhered to the shell of a supporter 7. And further more, the adhering tag 8 can be a soft circuit board and can be coated with adhering material to adhere on a surface of the supporter 7. By doing so, the fifth preferred embodiment can be implemented according to the actual needs. The supporter 7 can be an MP3, a mobile, a watch or a belt which can be easily carried with.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus for radio frequency identification, comprising:
    a supporter comprising a first slot and a second slot, said supporter internally connected to a first antenna;
    a data card having a second antenna; and
    a memory chip for storing data, said memory chip being configured to be selectively electronically connected to said second antenna by a contact on a surface of said memory chip,
    wherein said memory chip is removable to be inserted in said first slot, said data card is configured to be inserted into said second slot, and said first antenna is configured to communicate with said second antenna.

2. An apparatus for radio frequency identification according to claim 1, wherein said supporter is selected from the group consisting of MP3, mobile, and belt.

3. An apparatus for radio frequency identification according to claim 1, wherein said memory chip comprises a plurality of components comprising a diode and a capacitor.

* * * * *